(12) United States Patent
Park

(10) Patent No.: US 7,421,756 B2
(45) Date of Patent: Sep. 9, 2008

(54) RUBBER BLADE FOR WIPER

(76) Inventor: Se-Heon Park, 406-203, Saetbyeol maeul, Bundang-dong 39, Bundang-gu, Seongnam-si, Gyeonggi-do (KR)

( * ) Notice: Subject to any disclaimer, the term of this patent is extended or adjusted under 35 U.S.C. 154(b) by 0 days.

(21) Appl. No.: 11/385,683

(22) Filed: Mar. 22, 2006

(65) Prior Publication Data

US 2007/0000084 A1    Jan. 4, 2007

(30) Foreign Application Priority Data

Jul. 1, 2005    (KR) .................. 10-2005-0059320

(51) Int. Cl.
    *B60S 1/38*    (2006.01)
(52) U.S. Cl. .................. 15/250.48; 15/250.201
(58) Field of Classification Search .............. 15/250.48, 15/250.451–250.454, 250.201, 245, 250.001, 15/250.361
    See application file for complete search history.

(56) References Cited

U.S. PATENT DOCUMENTS

| | | | | |
|---|---|---|---|---|
| 2,733,472 A | * | 2/1956 | Karstens et al. .......... | 15/250.06 |
| 2,757,403 A | * | 8/1956 | Krohm ..................... | 15/250.44 |
| 3,238,555 A | * | 3/1966 | Cels ....................... | 15/250.04 |
| 3,808,630 A | * | 5/1974 | Ito .......................... | 15/250.44 |
| 6,813,803 B2 | * | 11/2004 | Leutsch ................... | 15/250.48 |
| 2007/0266517 A1 | * | 11/2007 | Kim et al. ................ | 15/250.29 |

FOREIGN PATENT DOCUMENTS

| | | | |
|---|---|---|---|
| DE | 19854372 | * | 5/2000 |
| FR | 1227688 | * | 8/1960 |
| FR | 2600294 | * | 12/1987 |

\* cited by examiner

*Primary Examiner*—Gary K Graham
(74) *Attorney, Agent, or Firm*—Lowe Hauptman Ham & Berner LLP

(57) ABSTRACT

Provided is a rubber blade for an automotive wiper capable of autonomously pressing firmly and resting securely against a windshield surface by altering the structure of the rubber blade. The rubber blade has a head portion forming an upper portion of the rubber blade. The head portion includes a pair of mounting slots for mounting the rubber blade along a wiper frame. The pair of mounting slots has a sectional offset angle ($\theta 1$), dependant on the disposition of the wiper frame. A central axis in a center between the pair of mounting slots in a sectional view of the blade is offset by an angle ($\theta 3$) from a vertical axis (L1). A wiping portion forms a lower portion of the rubber blade for contacting the windshield, and is disposed in the direction of the vertical axis (L1).

3 Claims, 5 Drawing Sheets

RUBBER BLADE FOR WIPER

BACKGROUND OF THE INVENTION

1. Field of the Invention

The present invention relates to a rubber blade for an automotive wiper, and more particularly, to a rubber blade for an automotive wiper that is changed in structure and shape so that it autonomously presses securely against an automotive windshield.

2. Description of the Related Art

An automotive wiper is a device for wiping a vehicular windshield clear of rain and other foreign substances. A wiper motor installed inside the vehicle drives a mechanical linkage to move wiper arms back and forth in a predetermined arc. Disposed on the end of the wiper arm is a detachably mounted wiper frame to which a wiper blade made of rubber is attached.

Conventional wipers attached to wiper arms include a skeletal frame and a blade portion mounted on the frame and contacting a windshield to wipe it, as shown in FIGS. 1 through 3.

A conventional wiper 10 includes: a main frame 12 having an adapter 11 thereon for mounting the wiper 10; a first frame 16 symmetrically mounted on rivet joints 13 at either end of the main frame 12, and having a blade bracket 15 for evenly distributing load on the blade 14 and holding the blade 14 inserted therein; a second frame 17 symmetrically mounted on rivet joints 13 at either end of the first frame 16, and having blade brackets 15 on either end thereof for evenly distributing load on the blade 14 and holding the blade 14 inserted therein; a blade 14 having a mounting slot 19 formed thereon along which resilient tension springs 18 and 18a having a predetermined elasticity are inserted, the resilient tension springs applying a predetermined load furnished by the first and second frames 16 and 17 along the length of the blade 14 so that the blade 14 presses evenly against a windshield when wiping it; and a metallic tension spring 18 and 18a inserted along the length on either side of the blade 14 to support the load furnished by the first and second frames 16 and 17.

Here, in order for the main frame 12 to transmit the movement of the wiper arm 10 to an arcuate movement of the blade 14, the wiper 10, blade 14, and the tension springs 18 and 18a that provide resilience to the blade 14 converge at one point so that they move in unison according to the movement of the wiper 10. Also, the first and second frames 16 and 17 evenly distribute load furnished by the main frame 12, and, along with the main frame 12, are press-formed to have holes formed therein to facilitate water drainage and reduce weight.

The blade 14 has a groove 20 running lengthwise therealong for guiding the blade brackets 15 of the first and second frames 16 and 17, and a separate mounting slot 19 for accommodating the tension springs 18 and 18a that provide resilience to the blade 14.

In the structure of this type of wiper, because the main frame 12 and the first and second frames 16 and 17 are formed separately from sheet metal and assembled together with the blade 14 and the tension springs 18 and 18a, in snowy and icy conditions of winter, the connecting and coupling portions of the unit can be hampered by frozen precipitation and thus not function properly. Accordingly, blade tension or other properties of the wiper can be affected so that the wiper is unable to aptly fulfill its wiping role.

Also, because the load on the blade is applied at certain points on the blade, it is unevenly distributed along the length of the blade. This unevenness causes premature wear of blade areas that are more compressed, while less compressed areas are prone to streak or overshoot the windshield glass underneath.

From a manufacturing point of view, the various components that are combined to form the wiper require multiple molds, which makes quality control that much more difficult, and increases the number of assembly processes that ultimately leads to a higher retail price.

The wiper shown in FIGS. 4 and 5 does not have a main frame supporting a metal frame separately from a blade, but has tension springs 18 and 18a inserted in the blade 14, over which a rubber cover 21 covers the unit.

That is, the mounting slot 19 is formed along the lengths on either side of the blade 14, tension springs 18 and 18a are inserted into each mounting slot, and a rubber cover 21 that functions as a spoiler is then inserted over the unit to conceal the tension springs 18 and 18a. This structure uses fewer parts than the above-mentioned conventional wiper, and thus avoids the problems caused by winter icing and other problems associated with wipers formed of multiple components.

However, a problem with the foresaid wiper is that the aggregate tension of the two tension springs 18 and 18a and the rubber cover 21 necessitate the wiper arm maintaining an increased load on the wiper for the wiper to be operationally effective, unduly stressing the mechanism. Also, this type of wiper is not interchangeable with existing wiper arms on vehicles that have a tension preset for the above-mentioned multi-point-type wiper blade. Furthermore, as shown in FIG. 5, because the wiper requires the rubber spoiler-cum-cover to complete the formation thereof, the latter item cannot be omitted.

Another conventional type of wiper, shown in FIGS. 6A and 6B, is formed with a separate spoiler 22 fitted at the top of the rubber blade that the tension springs 18 and 18a are inserted into. This type of blade prevents vibration, while maintaining a secure and even contact with a windshield.

However, because this wiper structure has an adapter 11 and frame 12 disposed in a vertical axis (H) direction of the adapter 11, the frame 12 or the tension spring by themselves cannot function as a spoiler. Therefore a separately formed spoiler is required, complicating the overall structure, and creating the possibility of vibration or judder caused by the spoiler and wind noise when pressed against a windshield.

SUMMARY OF THE INVENTION

The present invention is designed to solve the problems of the prior art, and therefore an object of the invention is to provide rubber blade for a wiper capable of enabling the retention of an overall disposition of the wiper at a favorable predetermined angle, preventing streaking and judder, and maintaining a secure contact of the blade to a windshield.

Another object of the invention is to provide a rubber blade for a wiper that has a structure allowing the even distribution of a desired load along the blade on a windshield for improved wiping capability, and a securer contact of the blade to the windshield so that noise caused by judder or streaking during driving is reduced.

In order to accomplish the above objects, the present invention provides a wiper having a frame supporting a rubber blade that closely contacts a surface of an automotive windshield and being attached to a wiper arm for pressing and operating the wiper against and across the windshield via an adapter, and a tension spring having a predetermined tension and inserted along a mounting slot of the rubber blade for evenly distributing load along the blade onto the windshield, wherein the wiper includes: a head portion forming an upper portion of the rubber blade and having a mounting slot for mounting the rubber blade to the frame, the mounting slot being inclined at an offset angle θ1 dependant on a disposition of the frame, such that a normal line of a cross section of the mounting slot is offset by a predetermined angle θ3 from a vertical axis L1 of the rubber blade; and a wiping portion forming a lower portion of the rubber blade for contacting the windshield, the wiping portion being disposed in a direction of the vertical axis L1.

The wiper of the present invention may also include an air pocket disposed on an upper side of the rubber blade for imparting added deforming and recovering elasticity thereto.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, preferred embodiments of the present invention will be described in detail with reference to FIGS. 7 and 8.

Figure 1:
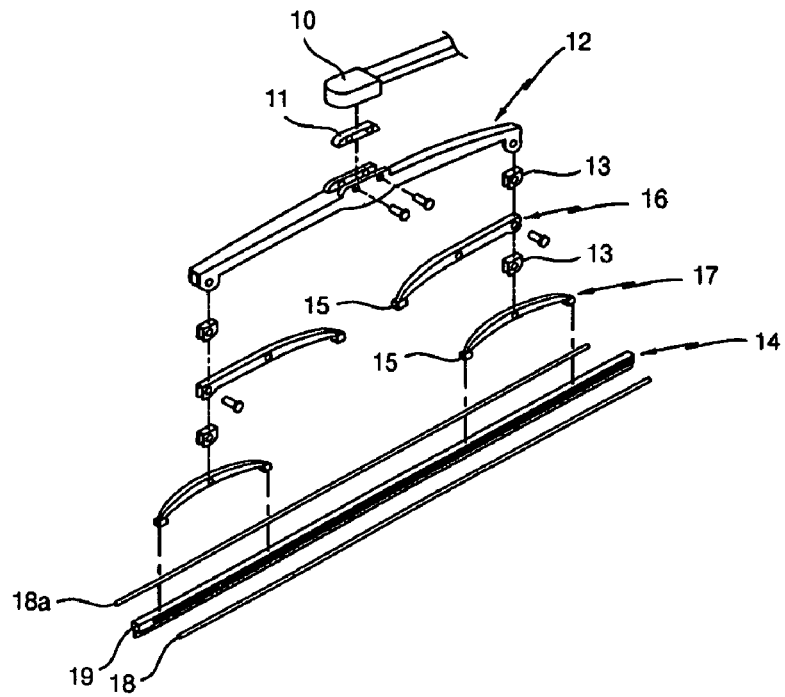
FIG. 1 is an exploded perspective view of a conventional automotive wiper.
Figure 2:
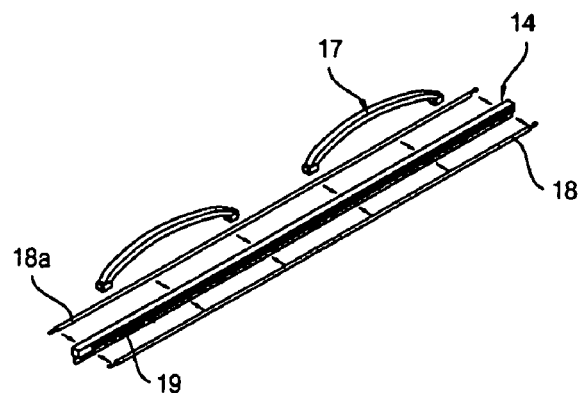
FIG. 2 is an exploded perspective view showing the assembly of the tension springs of a conventional wiper blade.
Figure 3:
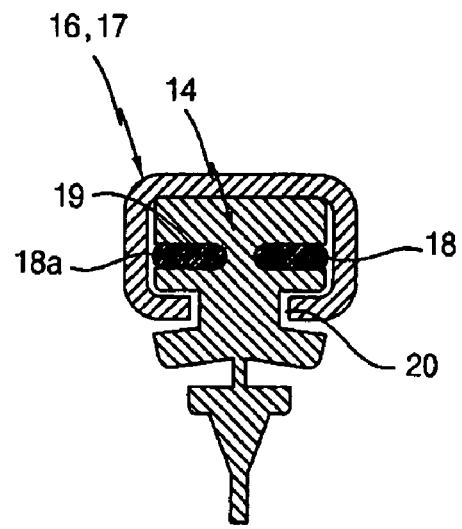
FIG. 3 is a sectional view showing the assembly of the tension springs of a conventional wiper blade.
Figure 4:
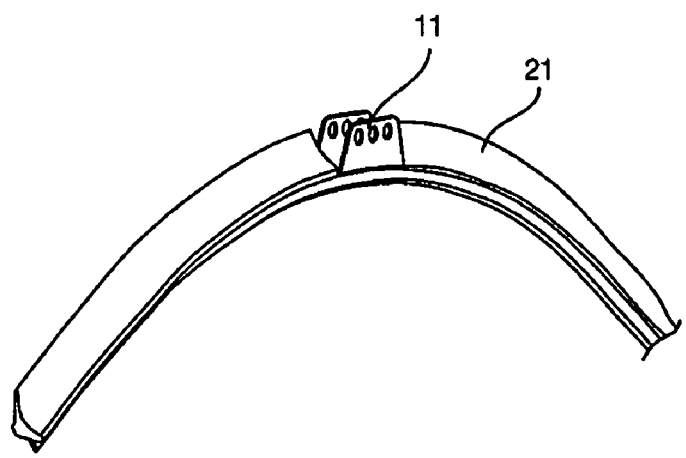
FIG. 4 is a perspective view of another type of conventional automotive wiper.
Figure 5:
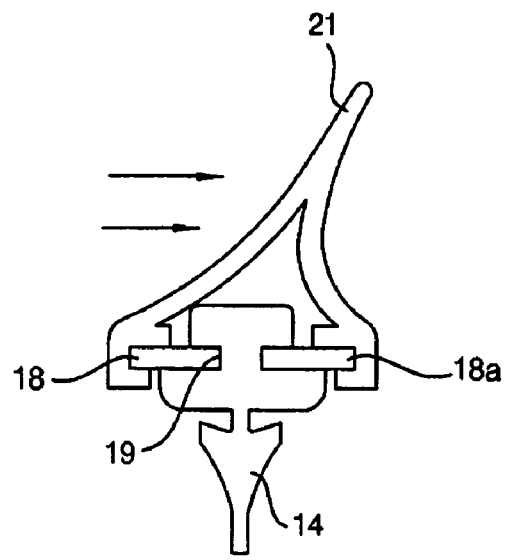
FIG. 5 is a sectional view of the automotive wiper of FIG. 4.
Figure 6A:
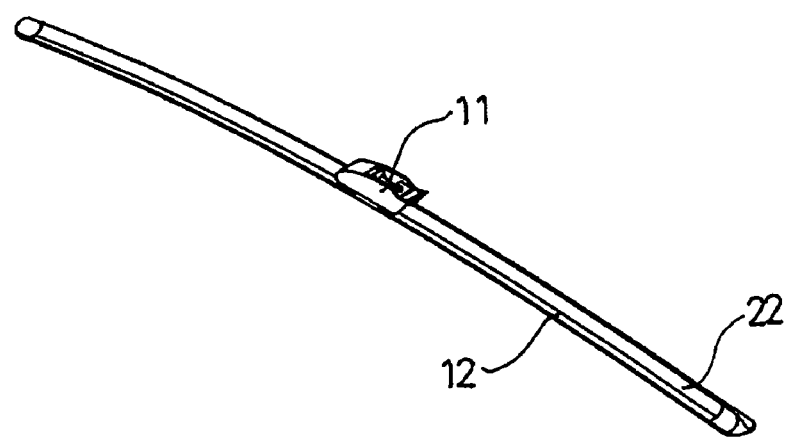
FIG. 6A is a perspective view of yet another type of conventional automotive wiper.
Figure 6B:
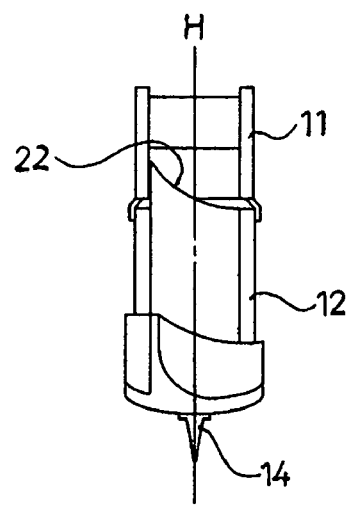
FIG. 6B is a sectional view of the automotive wiper of FIG. 6A.
Figure 7:
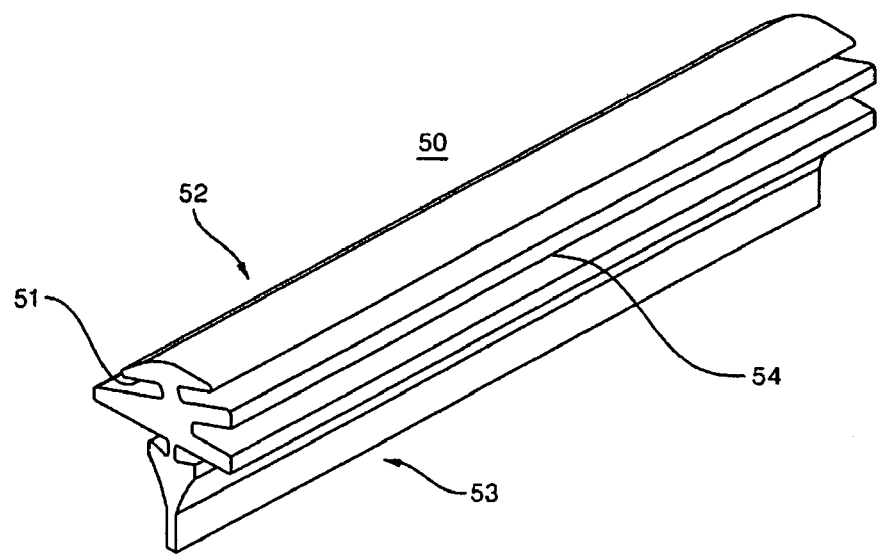
FIG. 7 is a perspective view of a rubber blade for an automotive wiper according to the present invention.
Figure 8:
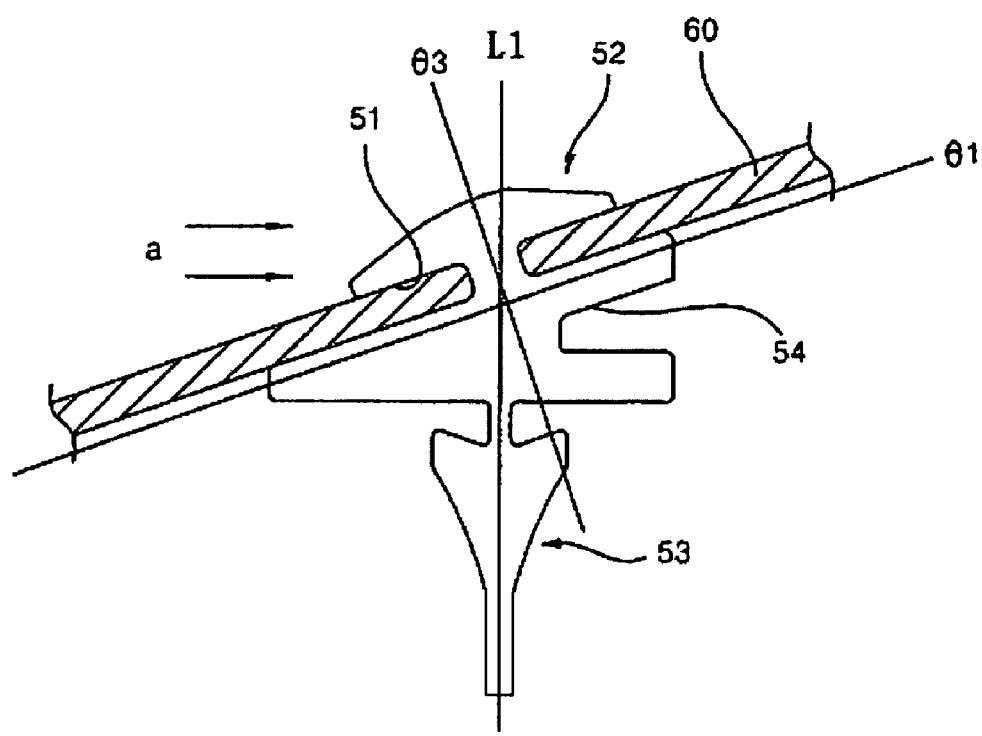
FIG. 8 is a sectional view showing the rubber blade for an automotive wiper of FIG. 7 in an assembled state.

FIG. 7 is a perspective view of a rubber blade for an automotive wiper according to the present invention, and FIG. 8 is a sectional view showing the rubber blade for an automotive wiper of FIG. 7 in an assembled state.

The rubber blade for an automotive wiper shown in FIGS. 7 and 8 may be compatible with wipers using conventional rubber blades (including wipers that are formed with a tensile member having a frame integrated with a tension spring and joined with a bent adapter).

Specifically, the rubber blade of the present invention can be applied to all kinds of wipers including: a frame supporting a rubber blade pressing against a windshield surface while the frame is simultaneously connected via an adapter to a wiper arm that moves the wiper back and forth across the windshield; and a tension spring inserted along a slot on a rubber blade when mounting to the blade, the tension spring having a predetermined tension for distributing load evenly across the blade against the windshield.

In further detail, as shown in FIGS. 7 and 8, the upper portion of the rubber blade 50 has a head portion 52 defining a mounting slot 51 for mounting the blade to a frame 60. The mounting slot 51 of the head portion 52 is inclined at an offset angle θ1 according to the disposition of a frame 60, such that a normal line of a cross section of the mounting slot 51 is offset by a predetermined angle from a vertical axis L1 of the rubber blade 50. The lower portion of the rubber blade 50 that contacts a windshield is a wiping portion 53, which is formed perpendicularly on the vertical axis L1.

Also, an air pocket 54 that aids in the deforming and rebounding of the rubber blade may be defined at one side of the upper portion of the rubber blade 50.

The head portion 52 of the rubber blade 50 that mounts to the frame 60 may be disposed to have a tilt according to the overall disposition of the frame 60 so that it increases the blade's contact with a windshield surface and thus, the blade's wiping capability, and also reduces air resistance.

The above-described rubber wiper blade of the present invention has the following characteristics.

As shown in FIG. 8, because the head portion 52 is offset at an angle θ3 with respect to a vertical axis L1, the frame 60 has the same offset. When the rubber blade is mounted through the mounting slots 51 to the frame 60, the tilt of the wiper against a windshield is a secure angle that inherently acts as a spoiler for oncoming airflow (a).

Additionally, because the head portion 52 and the wiping portion 53 are formed at an angle to each other, even though the frame is not disposed at a 90° with respect to a windshield, the profile of the rubber blade 50 is held to retain a disposition of nearly 90° with respect to the windshield, so that the blade presses firmly and securely against the windshield for superior wiping capability.

Furthermore, due to the built-in crook of the rubber blade 50, when the rubber blade 50 is mounted to the frame 60, even if the rubber blade 50 is non-linear with the frame 60, it can still press securely against a windshield, contacting the windshield at an angle close to 90°.

Here, through adjustment of the angle between the frame 60 and the rubber blade 50, when the rubber blade 50 is pressed in its entirety against an automotive windshield surface, the frame 60 may be adjusted so that the blade is disposed almost perpendicularly to the windshield so that the blade presses firmly against the windshield.

When the blade is pressed against the automotive windshield, the frame's 60 leading edge is disposed lower than the frame's trailing edge. The offset of the frame 60 and rubber blade 50 from a perpendicular axis may be freely adjusted. That is, the perpendicular angle of deflection of the rubber blade 50 and the frame 60 can be freely adjusted.

The air pocket 54 formed on a side of the rubber blade 50 augments the deforming and rebounding ability of the rubber blade 50 to increase the blade's overall elasticity.

The rubber blade for the wiper according to the present invention has an inherent tilt and is coupled to the frame, so that the wiper can act as a spoiler for oncoming airflow. Despite the wiper blade being structurally disposed at an angle other than 90° with respect to the windshield, the sectional profile of the rubber blade can be bent and connected to be disposed at an angle close to 90° with respect to the windshield, so that the blade closely and securely contacts the windshield for maintaining superior wiping capability.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A rubber blade for a wiper having a flat tension spring frame, said rubber blade comprising:

a head portion having:
  a first part; and
  a second part connected to said first part by a first hinge, said second part having an upper surface and a lower surface, said upper surface and said first part defining mounting slots located on both sides of the first hinge to receive the flat tension spring frame and being parallel so that a first axis extends perpendicularly through the first hinge between the slots;
a wiping portion being connected to the lower surface of said second part of said head portion by a second hinge and having a second axis; and
an air pocket formed on a side of the first axis opposite to the direction of convergence, the air pocket comprising a longitudinal groove extending along a length of the rubber blade thereby facilitating deforming and recovering elasticity to the rubber blade,
wherein said upper surface and said lower surface converge towards each other in a direction of a lower edge of a windshield.

2. The rubber blade according to claim 1, wherein, said head portion and said wiping portion are unitary.

3. The rubber blade according to claim 1, wherein said mounting slot of said blade, in use, receives the flat tension spring frame and, when said blade is disposed on the frame and is placed against a windshield, the flat tension spring frame defines an angle with respect to the windshield thereby acting as a spoiler.

* * * * *